(12) United States Patent
Torrents Barrena et al.

(10) Patent No.: US 11,509,798 B2
(45) Date of Patent: Nov. 22, 2022

(54) BACKGROUND PRINT AGENT ENCLOSED REGION REMOVAL

(71) Applicant: HEWLETT-PACKARD DEVELOPMENT COMPANY, L.P., Spring, TX (US)

(72) Inventors: Jordina Torrents Barrena, Sant Cugat del Valles (ES); Marcos Casaldaliga Albisu, Sant Cugat del Valles (ES); Carles Carmona Calpe, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 85 days.

(21) Appl. No.: 17/188,014

(22) Filed: Mar. 1, 2021

(65) Prior Publication Data
US 2022/0274397 A1    Sep. 1, 2022

(51) Int. Cl.
| | |
|---|---|
| *G06K 15/00* | (2006.01) |
| *H04N 1/62* | (2006.01) |
| *H04N 1/60* | (2006.01) |
| *H04N 1/58* | (2006.01) |
| *G06K 15/02* | (2006.01) |

(52) U.S. Cl.
CPC .......... *H04N 1/62* (2013.01); *G06K 15/1878* (2013.01); *H04N 1/58* (2013.01); *H04N 1/6041* (2013.01); *H04N 1/6094* (2013.01)

(58) Field of Classification Search
CPC combination set(s) only.
See application file for complete search history.

(56) References Cited

U.S. PATENT DOCUMENTS 11,308,373 B2 *    4/2022    Encrenaz .................. G06T 5/30

OTHER PUBLICATIONS

S. F. Frisken; "Adaptively Sampled Distance Fields: A General Representation of Shape for Computer Graphics"; Dec. 2000; 8 pages.

* cited by examiner

*Primary Examiner* — Barbara D Reinier

(57) ABSTRACT

In one example in accordance with the present disclosure, a printing device is described. The printing device includes a print controller with a processor and memory. The print controller generates print instructions. Specifically, the print controller receives print image data representing an image to be printed and identifies enclosed regions in a background print agent plane. The print controller also determines a size of the enclosed regions of background print agent plane and responsive to the size of an enclosed region being smaller than a threshold size, removes the enclosed region from the background print agent plane. The printing device also includes a print agent distribution system to apply the background print agent and the image print agent to a substrate according to the print instructions.

15 Claims, 10 Drawing Sheets

BACKGROUND PRINT AGENT ENCLOSED REGION REMOVAL

BACKGROUND

When printing a print agent such as an ink, toner, or the like onto a substrate to form an image and/or text, a background layer of print agent may be applied above or below the print agent used to form the image.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
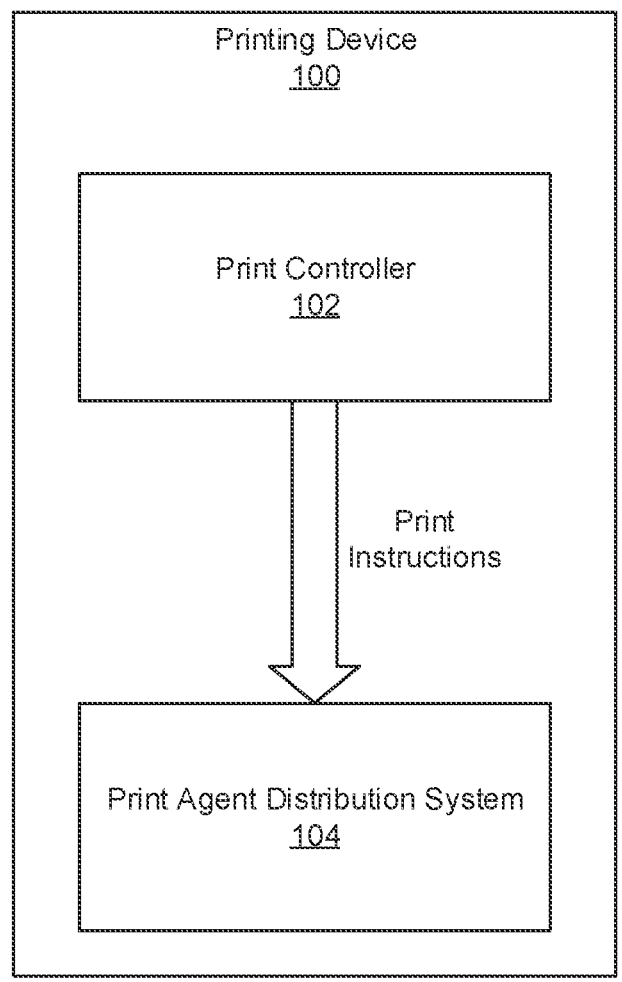
FIG. 1 is a block diagram of a printing device for removing regions from a background print agent plane, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Printing may involve the deposition of a print agent, such as ink, toner, or the like on a substrate in a pattern to form text and/or images. In some cases, the substrate may be non-white, which may impact the saturation or appearance of the print agent used to form the images. That is, when printing on a non-white substrate, a physical output may have different color characteristics than intended, resulting in content with a coloration that is different than the intended coloration of the content. As a particular example, a user may generate the text and/or images using a computer-aided programming and in so doing may select colors for the image. However, when physically depositing the print agent on to the non-white substrate, the print agents may interact with the non-white substrate such that the color of the printed text and/or images does not match what was generated using the computer-aided application. In some examples, when printing on a non-white substrate, the colored print agent may be nearly invisible.

Accordingly, in some examples, a background print agent is to be applied above or below an image on the substrate. For example, when printing a colored image on a non-white, or non-uniform, substrate, a layer of white background print agent may be applied to the substrate before the colored image is printed over the top. In this way, the white background lies below the colored image and provides an even tone to the finished printed product, and may, for example, prevent image regions from appearing 'grey' (or some other color) in regions where the color of the substrate shows through.

In other examples, the image may be under-printed with a background print agent on a transparency, for example when it is to be viewed from the printed side. That is, a colored image may be printed on a transparent substrate (a 'transparency') and a background layer of print agent may be applied over the top of the colored image. In this way, the background print agent provides a more uniform background opacity when the image is viewed through the transparency.

While printing a background print agent on a plane before printing a colored image and/or text evens out the color of an image and provides a better match between an intended color and a resultant color, some complications arise when using a background print agent.

For example, white ink, which may be the background print agent, may spread beyond color inks as white ink particles are bigger. The greater spreading of the white ink may result in a visible and non-desired halo around text and images. Moreover, there may be a loss of detail in small text and thin lines caused when adjacent characters or lines alias together.

While some methods have been proposed to eliminate the halo defect while preserving small content, some small and elongated artifacts may still remain. Such artifacts may manifest in a printed product as small regions, or "tears" of background print agent. Such tears may accumulate along acute angles of a printed text or image. The suppression of such artifacts may be complex as they are not readily distinguishable from thin fine details of the text/image.

Accordingly, the present specification describes an operation that delivers better print quality and does not involve end-user intervention. In an example, the operations may be executed after an operation to remove a background halo, without compromising the quality achieved by such a halo-removing operation.

Specifically, according to the present method, a binary threshold image is generated which sets areas of an image plane that are to include just the background color to one color, for example black, and other portions of the image to another color, for example, white. The enclosed regions of background color are then identified and an area of each enclosed region is calculated. An array is initialized to store the indexes of enclosed regions with an area less than a threshold size. A binary mask may then be created with such enclosed regions filled. Afterwards, the enclosed regions are removed from the background print agent plane such that no background print agent will be printed thereon. As such, the tears are removed as the portions of background print agent that result in the tears is not printed, i.e., it is removed from the background print agent plane. Note that in this example, the removal of the enclosed regions may be performed digitally before a physical product is printed. That is, hardware resources of a computing device may operation to identify enclosed regions that are to receive background print agent and, in some examples, may remove those enclosed regions from the background print agent plane such that no background print agent is deposited in these enclosed regions.

However, it may be that some enclosed regions may be identified, but that are desired to be maintained in the printed product. For example, certain enclosed regions may pertain to fine detail such as text. Using the above operations, these fine details may be suppressed. To recover these "false" enclosed regions, a bounding box may be drawn around each selected enclosed region. A morphological closing operation may be used to generate a mask without holes between bounding boxes. A largest connected component may be restored by adding their inner content to the previous enhanced image.

Specifically, the present specification describes a printing device. The printing device includes a print controller. The print controller includes a processor and memory to generate print instructions. Specifically, the print controller 1) receives print image data representing an image to be printed and 2) identifies, in the print image data, enclosed regions of background print agent in a background print agent plane. The print controller also determines a size of enclosed regions of background print agent and responsive to the size of an enclosed region being smaller than a threshold size, removes the enclosed region from the background print agent plane. The printing device also includes a print agent distribution system to apply the background print agent and the image print agent to a substrate according to the print instructions.

The present specification also describes a method. According to the method the print controller receives print image data representing an image to be printed. From the print image data, enclosed regions of a background print agent on a background print agent plane are identified A size of enclosed regions of background print agent are determined and responsive to the size of an enclosed region being smaller than a threshold size, the print controller removes the enclosed region from the background print agent plane and the print agent distribution system applies the background print agent and the image print agent to a substrate according to the print instructions.

The present specification also describes a non-transitory machine-readable storage medium. The non-transitory machine-readable storage medium is encoded with instructions executable by a processor to receive print image data representing an image to be printed and generate a binary threshold image wherein regions that receive a background print agent is made a first color and regions that do not receive a background print agent are made a second color. The instructions are also executable by the processor to determine, from the binary threshold image, 1) enclosed regions of background print agent and 2) a size of each enclosed region of background print agent. The instructions are also executable by the processor to, responsive to a size of an enclosed region being less than a threshold amount, remove the enclosed region from the background print agent plane. The instructions are also executable by the processor to apply the background print agent and the image print agent to a substrate according to the print instructions.

Such a printing device, method, and machine-readable storage medium ensures both halo and tear suppression and recovering of conflict image regions build on small contours and edges (e.g., finer text, thin artwork), automatically without user intervention. Such systems and methods 1) produce high quality printed products without artifacts; 2) increase the print quality without end user intervention; and 3) may be implemented across different platforms. However, it is contemplated that the systems and methods disclosed herein may address other matters and deficiencies in a number of technical areas.

As used in the present specification and in the appended claims, the term "enclosed region" refers to a region of a print agent plane that 1) has pixels of a value indicating background print agent placement and 2) are surrounded by regions that are not to receive background print agent. For example, a circle shape of a background print agent plane may be an enclosed region because it is encompassed by a continuous and closed circular set of pixels that have a different value than those on the interior of the circle shape.

Turning now to the figures, FIG. 1 is a block diagram of a printing device (100) for removing regions from a background print agent plane, according to an example of the principles described herein. The printing device (100) includes a print controller (102) which generally controls the operation of a print agent distribution system (104). That is, the print agent distribution system (104) may include the physical components to eject a print agent such as ink, toner, or the like onto a substrate to form printed text and/or images. The instructions may be received from a computing device coupled to the printing device (100). The print controller (102) may receive the instructions and operate the print agent distribution system (104) based on the received instructions. As a particular example, the print controller (102) may control the operation of scanning carriages that hold printheads and may also control the fluid ejection components of the printheads.

In general, the print controller (102) may include various hardware components, which may include a processor and memory. The processor may include the hardware architecture to retrieve executable code from the memory and execute the executable code. As specific examples, the print controller (102) as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may include many types of memory including volatile and non-volatile memory. For example, the memory may include Random Access Memory (RAM), Read Only Memory (ROM), optical memory disks, and magnetic disks, among others. The executable code may, when executed by the print controller (102), cause the print controller (102) to implement at least the functionality of generating print instructions, which includes removing enclosed regions of a background print agent plane.

Specifically, the print controller (102) may receive print image data, or a print job, that represents an image to be printed. The print image data may, for example, be indicative of an image, text, a pattern or the like. In some examples, the print image data may include data specifying location(s) on a substrate in which print agent should be printed to the substrate in order to form the image and/or text. The print image data may be in the form of at least one grid of values corresponding to colors of the pixels in the image. In some examples, the print image data may be in the form of a set of position vectors that specify the coordinates of each region and color vectors that specify the colors of each region. In some examples, the color vectors may be Red-Green-Blue (RGB) vectors. The data may be received over a network, or from a local memory or the like.

In some examples, the print image data may be provided as a set of color planes. In other examples, color planes may be derived from received print image data. For example, in printing, it may be that a set of colored print agents comprising cyan, magenta, yellow and black (CMYK) is provided. A color plane (which may sometimes be referred to as a 'separation') relating to each of these print agents may be defined such that, when overlaid, an intended image may be formed. This image may comprise cyan, magenta, yellow and black portions but also colors resulting from a mixture of these print agent colors (with the mixture in some examples being a human-perceived mixture of separate dots of print agent).

In some examples, a background print agent plane may be provided or derived. In some examples, a background print agent is to be applied above or below an image on the substrate. For example, when printing a colored image on a non-white, or non-uniform, substrate, a layer of white background print agent may be applied to the substrate before the colored image is printed over the top. In this way, the white background lies below the colored image and provides an even tone to the finished printed product, and may, for example, prevent image regions from appearing 'grey' (or some other color) in regions where the color of the substrate shows through. In another example, a colored image may be printed on a transparent substrate (a 'transparency') and a background layer of print agent may be applied over the top of the colored image. In this way, the background print agent provides a more uniform background opacity when the image is viewed through the transparency. In other examples, the image may be under-printed with a background print agent on a transparency, for example when it is to be viewed from the printed side.

In some examples, an under-print mode of printing is used whereby a layer of background print agent is formed on the substrate followed by layer(s) of image print agent to form the image. In other examples, an over-print mode of printing is contemplated whereby the image print agent is first applied to the substrate followed by a layer of background print agent. In some examples, the background print agent is applied as a 'sandwich' layer between image layers (for example to provide images which are visible on both sides of a transparency).

While in some examples, such background print agent planes may be provided as the print image data, in other examples, a background print agent plane may be derived therefrom. In one example, a white background plane may be defined along with other color planes. For example, an image may be defined with CMYK+W (white) color planes, whether by a user or automatically, for example during a Raster Image Processing (RIP) stage of preparing an image for printing. In other examples, a white plane may be added to other previously determined color planes by the print controller (102). In some examples, the colors of the image which comprise the color of the background print agent (for example, a portion of the image may be white, and the background print agent may also be white) may be added to or included in the background print agent color plane.

In some examples, the background print agent may be a white print agent whereas the image print agents may include, for example cyan, magenta, yellow and black print agents. Other image print agent sets may include, for example, in addition to the CMYK print agents, an orange and green print agent, light versions of cyan, magenta, yellow and/or black, sets including a 'spot color' which may for example be specific to an intended use, or any other set of print agents.

The color planes are derived from the image data. In some examples, the image data may include the color planes, which are extracted therefrom to derive the color planes. In other examples, a color plane, or color planes, may be determined by the print controller (102). For example, RGB image data may be converted to CMYK color data, and/or a background print agent color plane may be derived based on system specifications, an indication of a substrate for printing, user input or the like.

Figure 4A:
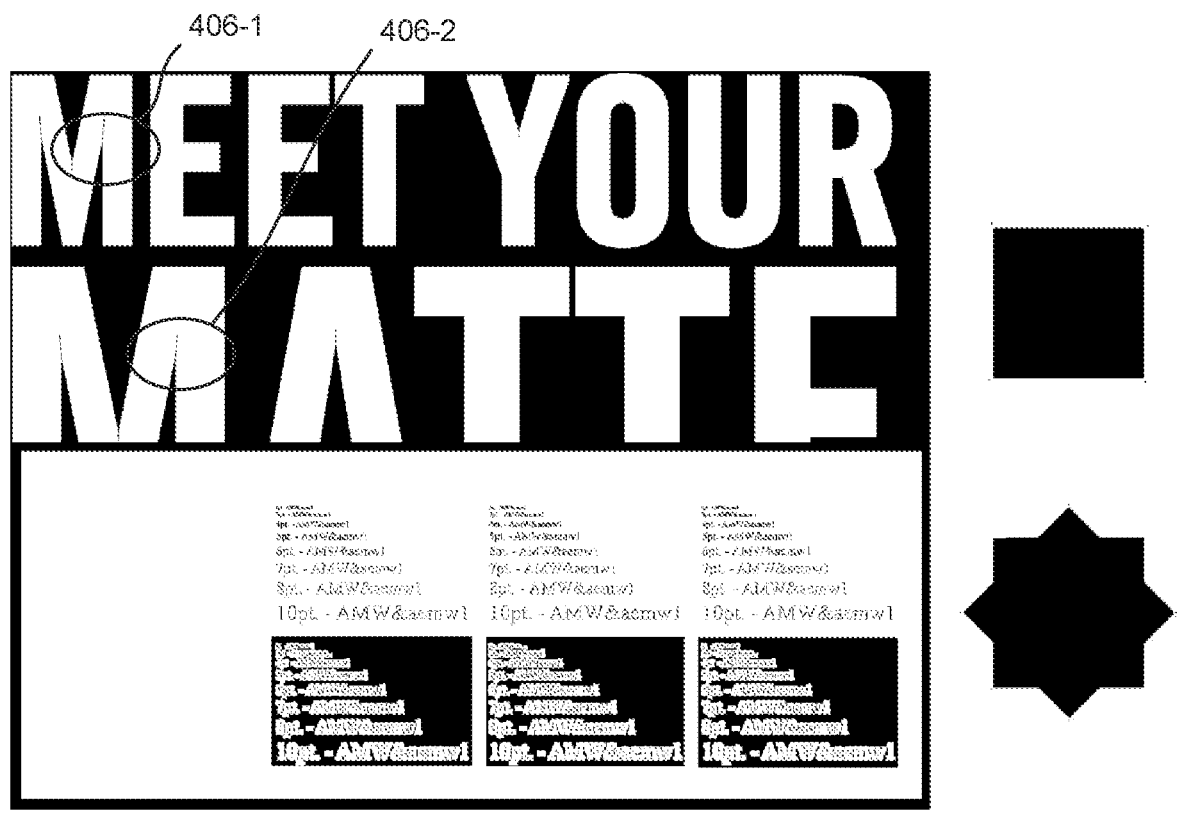
FIGS. 4A-4F depict the removal of enclosed regions from a background print agent plane, according to an example of the principles described herein.
Figure 4A:
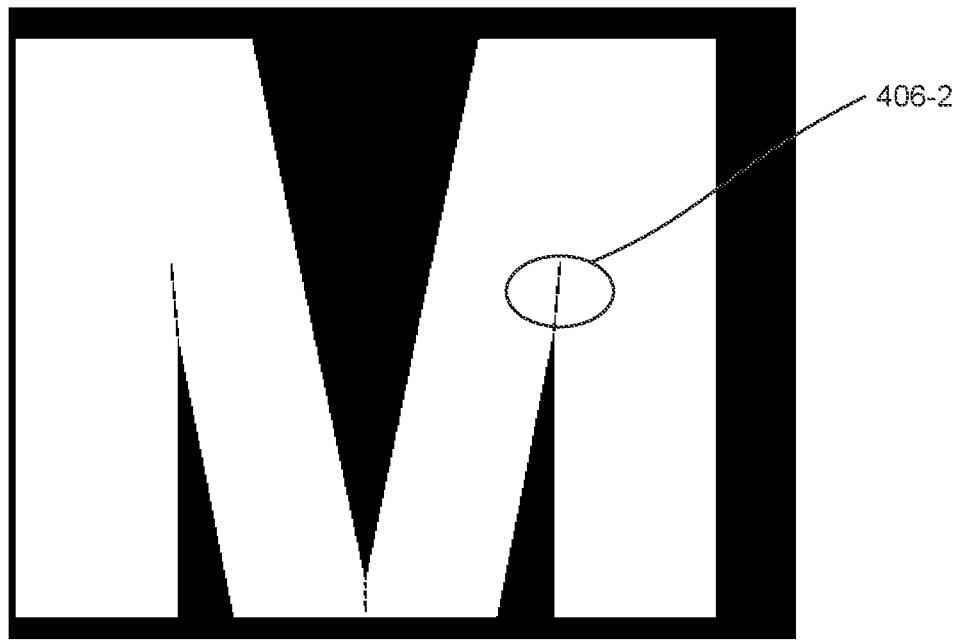

The print controller (102) may identify enclosed regions of a background print agent plane. That is, in any image, there may be regions where background print agent is entirely surrounded by regions that are not to receive print agent. FIG. 4A depicts an example of such an enclosed region. Specifically, in FIG. 4A, the black regions indicate locations where a background print agent is to be deposited and the white regions indicate locations where no background print agent is to be deposited. In one particular example, an enclosed region of a background print agent may result as the background print agent is eroded. That is, as described above, the background print agent may be eroded such that the inevitable expansion of the background print agent does not extend beyond the boundary of the image print agent planes. Doing so removes the halo effect described above. However, so doing may also introduce certain enclosed regions, or "tears" of background print agent.

Accordingly, the print controller (102) may identify, in a digital file, enclosed regions. In one example, the print controller (102) may do so by generating a digital binary threshold image of the image represented by the print agent planes. For example, those regions of the background print agent plane that are to include just the background print agent may be identified by one binary number, for example a 1, and may be identified by one color, for example, black. Regions of the background print agent plane that are not to include the background print agent, may be identified by another binary number, for example a 0, and may be identified by another color, for example white. In this example, the print controller (102) may identify, for each pixel location, a respective binary value. Having done so, the print controller (102) may identify the pixel boundary of a region having the first binary value 1, and identify the area within this boundary as an "enclosed region." Note that not every enclosed region is an artifact of a printing limitation. For example, given the character "M," the space around the M may be enclosed by other components of the image, but may be intentional to define the M. However, near the acute angle boundaries of the character "M," certain enclosed artifacts may result that appear to reduce the quality of the print. It is these, smaller, unintentional enclosed regions that are addressed by the current print controller (102). Specifically, the print controller (102) determines a size of each enclosed region of the background print agent plane.

That is, the print controller (102) cycles through each enclosed region of background print agent, and determines the area, or the number of pixels, within each enclosed region. That is, as described above, the print controller (102) can identify regions of connected pixels having the same value and can therefore determine how many pixels are in that connected region.

Responsive to an enclosed region being smaller than a threshold size, the print controller (102) may remove the enclosed region from the background print agent plane. As used in the present specification and in the appended claims, the term "removed" refers to the removal of the particular area from receiving a respective print agent. For example, if an enclosed region is identified, the pixels that make up this region do not receive a background print agent where they otherwise would have. As this portion of the background print agent plane no longer includes an indication to deposit print agent in this particular region, the artifact resulting from deposition of the background print agent at this region is alleviated.

In some examples, the threshold size may be a variety of values. For example, the threshold size may be 30 pixels. That is, enclosed regions with less than 30 connected pixels of the same value may be removed from the background print agent plane as being identified as a "tear." By comparison, larger conglomerations of similarly-valued pixels may be identified as intentional and therefore not removed, that is the background print agent is still deposited at this location.

The printing device (100) also includes a print agent distribution system (104) to receive the print instructions and execute printing based thereon. That is, the print agent distribution system (104) applies the background print agent and the image print agent to a substrate according to the print instructions.

In some examples, the substrate is a fibrous sheet-like material such as paper, fabric or a synthetic material such as a plastic sheet, which may be a transparency. In some examples, the substrate may be colored or off-white. In some examples, the substrate may be textured, the texture causing the substrate to appear to have fine grain color variations. While such substrates may, in particular, benefit from a background print agent, in principle, the substrate could be any color or type.

In an example, the print agent distribution system (104) may include print heads (for example, inkjet or bubble jet print heads), printing drums or plates, or the like. The print agent distribution system (104) may for example include an electrophotographic printing apparatus (including liquid electrophotographic printing apparatus). In some examples, the print agent distribution system (104) may be a scanning print agent distribution system (104) (i.e., a print head makes printing passes relative to a substrate). In other examples, the print agent distribution system (104) may be a non-scanning print agent distribution system (104), for example comprising a page wide array of nozzles which apply print agent to a substrate.

In some examples, an agent distribution device of the print agent distribution system (104) includes at least one liquid ejection device to distribute a print agent. A liquid ejection device may include at least one printhead (e.g., a thermal ejection based printhead, a piezoelectric ejection based printhead, etc.). In some examples, the print agent distribution system (104) is coupled to a scanning carriage, and the scanning carriage moves along a scanning axis over the substrate. In other examples, the print agent distribution system (104) may include other types of liquid ejection devices that selectively eject small volumes of print agent.

Figure 2:
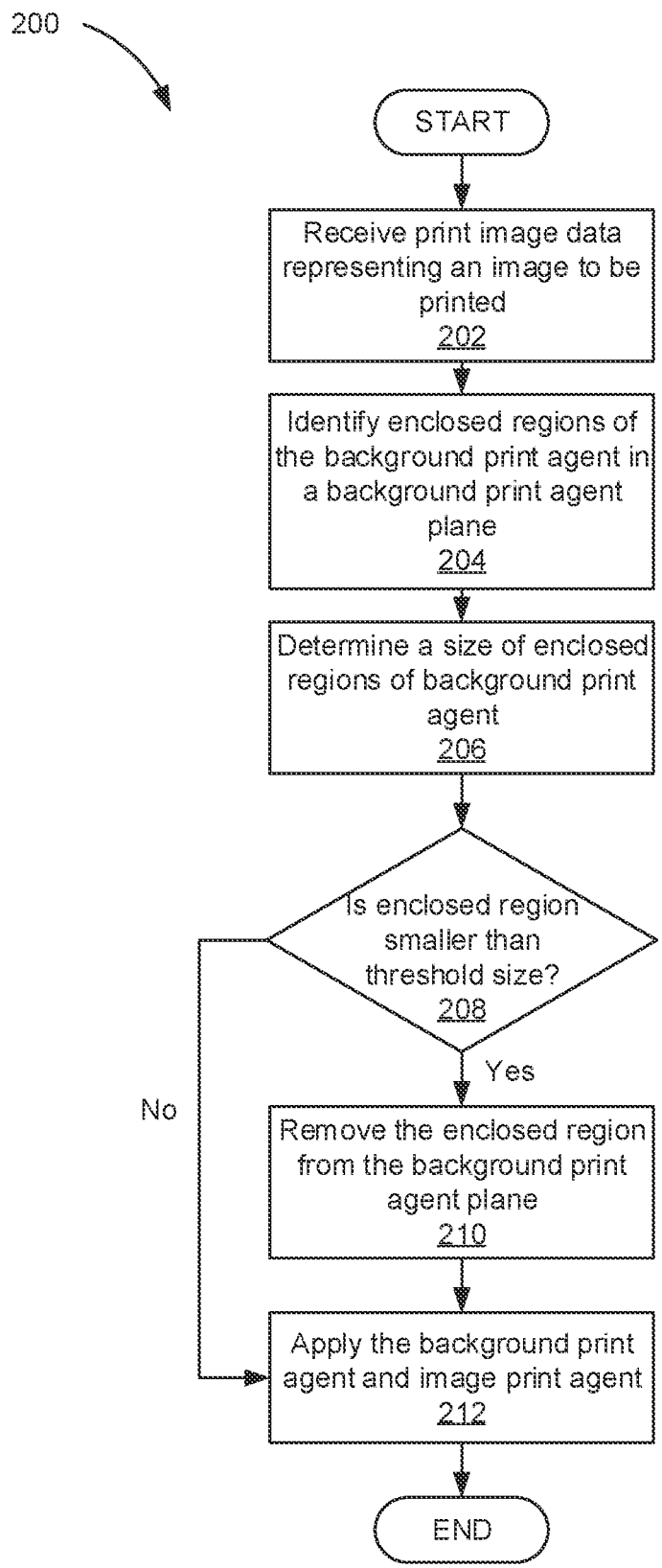
FIG. 2 is a flow chart of a method for removing regions from a background print agent plane, according to an example of the principles described herein.

FIG. 2 is a flow chart of a method (200) for removing regions from a background print agent plane, according to an example of the principles described herein. According to the method (200), print image data representing an image to be printed is received (block 202) at a printing device (FIG. 1, 100). As described above, such data may be received from a computing device coupled to the printing device (FIG. 1, 100). As described above, the print image data may include data specifying location(s) on a substrate in which print agent should be printed to the substrate in order to form the image and/or text. In some examples, the print image data may be in the form of a set of position vectors that specify the coordinates of each region and color vectors that specify the colors of each region. In some examples, the color vectors may be Red-Green-Blue (RGB) vectors. The data may be received over a network, or from a local memory or the like.

In some examples, the print image data may be provided as a set of color planes or the color planes may be derived from received print image data. In some examples, the background print agent plane may be provided as part of the print image data, or may be derived from the print image data. For example, an image may be defined with CMYK+W (white) color planes while in other examples, a white plane may be added to other previously determined color planes by the print controller (FIG. 1, 102).

In other examples, a color plane, or color planes, may be determined by the print controller (FIG. 1, 102). For example, RGB image data may be converted to CMYK color data, and/or a background print agent color plane may be derived based on system specifications, an indication of a substrate for printing, user input or the like.

With the print image data received (block 202), the print controller (FIG. 1, 102) may identify (block 204) the enclosed regions of a background print agent in a background print image plane. That is, the print controller (FIG. 1, 102) may identify (block 204) those regions of the background print agent plane that are to receive background print agent and that are completely surrounded by regions that are not to receive background print agent. This may be done by assigning each pixel a value of 1 or 0 based on whether it is a background print agent pixel or not. Groupings of pixels 1) having a value associated with the background print agent and 2) that are enclosed by pixel values that are not associated with the background print agent, are defined as enclosed regions and a size of each of these enclosed regions is determined (block 206) by the print controller (FIG. 1, 102).

The print controller (FIG. 1, 102) then determines (block 208) whether an enclosed region is smaller than a threshold size, which threshold size may be a default value or user-defined. Responsive to the enclosed region being smaller than the threshold size (block 208, determination YES), the method (200) includes removing (block 210) this enclosed region from the background print agent plane. That is, this enclosed region, being smaller than the threshold size, is likely an unintended artifact of a previous operation and as such is removed (block 210).

Upon removal (block 210), this enclosed portion is not to receive background print agent, which alleviates the appearance of a "tear" artifact. By comparison, responsive to the enclosed region being larger than the threshold size (block 208, determination NO), an enclosed region is not removed from the background print image plane and is instead retained in the background print image plane. In either case, the print agent distribution system (FIG. 1, 104) applies (block 212) the background print agent and the image print agent to a substrate according to the print instructions. As such, print agent (block background and image) is applied so as to result in a high-quality high-resolution image, all while accounting for artifacts that may occur when using a non-white substrate and a corresponding background print agent.

Figure 3:
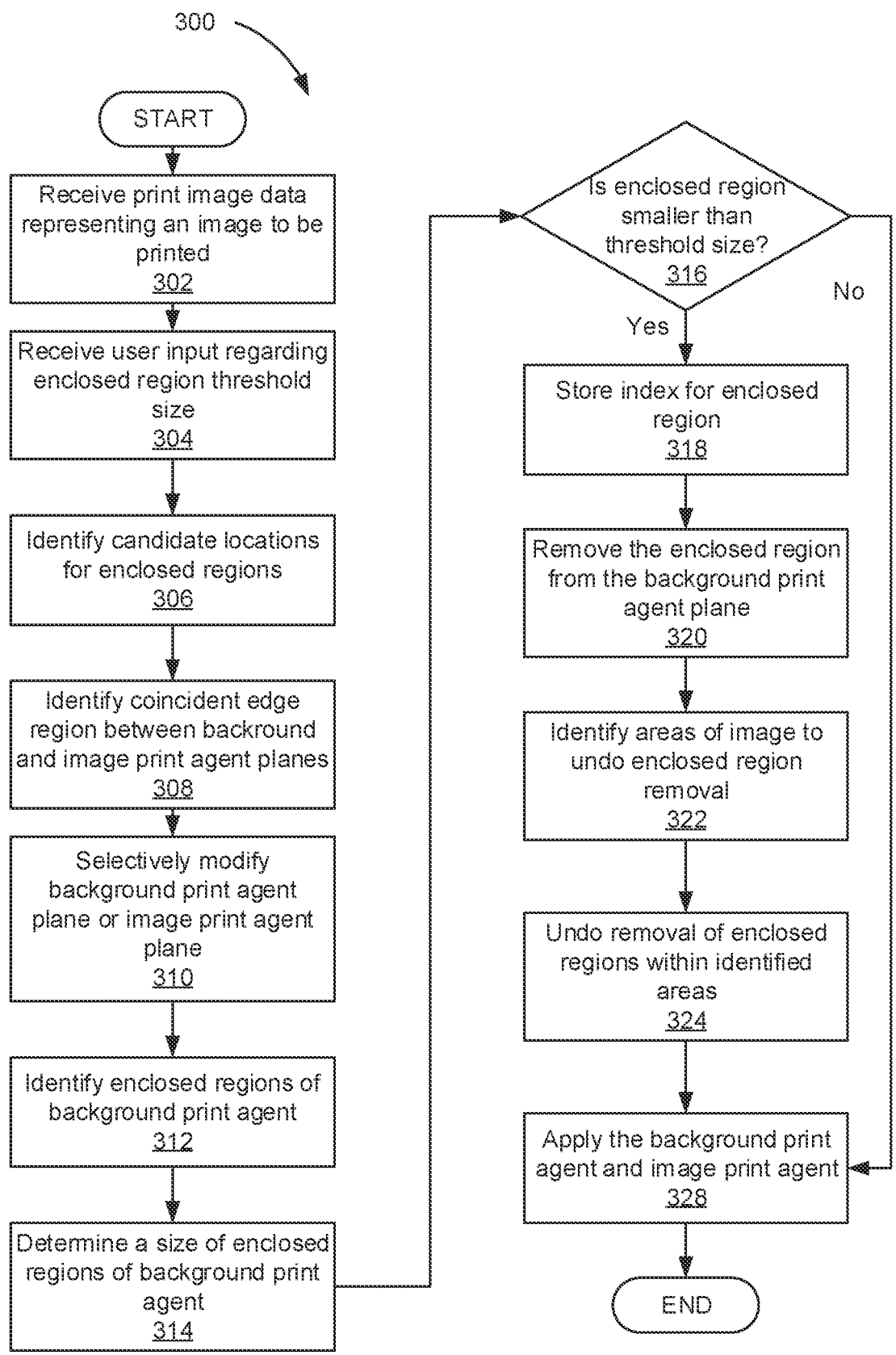
FIG. 3 is a flow chart of a method for removing regions from a background print agent plane, according to another example of the principles described herein.

FIG. 3 is a flow chart of a method (300) for removing regions from a background print agent plane, according to another example of the principles described herein. According to the method (300), print image data representing an image to be printed is received (block 302). This may be done as described above in connection with FIG. 2.

In an example, the method (300) includes receiving (block 304) user input regarding enclosed region threshold size. That is, in an example described above, the threshold by which it is determined if an enclosed region is to be removed or retained in a background print agent plane is a default amount, e.g., 30 pixels. However, this value may be varied based on application. For example, the smaller the threshold size, the more processing occurs prior to printing. Accordingly, a user may tailor the enclosed region threshold size based on a desired quality and/or printing time. As a particular example, a user may indicate a "high," "medium," or "low" print quality, which each may map to different enclosed region threshold sizes.

In some examples, the processing of the image to identify enclosed regions may be tailored to a subset of areas of the print image data. For example, as described above, "tears" may accumulate near acute angle boundaries of the image. Accordingly, the print controller (FIG. 1, 102) either automatically or via user input, may identify (block 306) as candidate locations where enclosed region are to be removed, those locations that include an acute boundary of image print data. As such, a subset of the enclosed regions may be processed for enclosed region removal such that processing and printing time is conserved. In an example, the print controller (FIG. 1, 102) may, using the aforementioned pixel values, identify the boundary of the print image data to identify any acute angles therein.

In an example, the method (300) also includes certain pre-processing operations to further enhance image quality. For example, as described above, the method (300) may include operations to remove any halo effect that may result from a background print agent expanding more than the image print agent that is deposited.

For example, a coverage level (i.e., depth or amount of background print agent) may be chosen in view of the color density of the background or in view of the quality of the colors in the image. For example, the vividness or quality of the image colors may be improved by over- or under-printing on a background color. This may result in a relatively high coverage level. In some examples, the coverage level of the background may exceed the coverage level in any given image color plane. This can in turn mean that the background print agent is more likely to 'bleed' from a location at which it is placed to a nearby location. In other words, the background print agent may be more prone to spreading beyond intended borders than an image print agent. Where background print agent is applied to improve the resulting image quality in regions which are intended to underlie image portions exactly (i.e., where there is a "coincident edge" as defined above), this can result in an unintended "halo" effect where the background print agent is visible around the edge of the image print agent.

Accordingly, the method (300) includes identifying (block 308) a coincident edge region in the background print agent plane and an image agent plane. That is, these planes identify an intended placement of a respective agent. Accordingly, a coincident edge region is an edge in an area to be printed on with both the background print agent and the image print agent. In some examples, coincident edge identification may be carried out for all image print agent planes, for example to identify coincident edges between a background print agent plane and any specified image print agent plane.

In an example, the method (300) includes selectively modifying (block 310) at least one of the background print agent plane and the image print agent plane in the vicinity of the identified coincident edge region to determine a modified plane. The modification may be selective in that it occurs in the identified coincident edge region, and not in image areas which are not in the vicinity of coincident edge regions.

In an example, the selective modification (block 310) may include performing a pixel erosion along the identified coincident edge region in the background print agent plane and determining whether there is a local region of the background print agent plane that will be less than a threshold size following the erosion. If this occurs, i.e., if a local region will be less than a threshold size following erosion, this region is excluded from the pixel erosion operation.

For example, it may be the case that an erosion of 4 pixels along a coincident edge is to be performed. To consider a relatively fine feature, such as a letter in text, the lines of the letter may be relatively thin, and may be less than 8 pixels thick. Performing the erosion operation may result in the intended placement of white ink to form the shape being removed entirely from the background print agent plane. Therefore, in this example, the small shape would be preserved in the background print agent plane by the exclusion operation.

As a particular example, the print controller (FIG. 1, 102) may identify those regions which would be eroded entirely by the erosion operation. In some examples, this operation may be performed at a pixel level, and may include checking for the presence of pixel neighbors after erosion using a kernel of programmable size. In another example, a pixel erosion may be carried out followed by a dilation, in which neighboring pixels are added to present pixels along the edge. If a feature is eroded entirely, it will not be restored by a dilation operation as there will be no present pixels remaining, and therefore comparing an original color plane to an 'eroded then dilated' color plane will identify those local regions which are entirely eroded by the erosion operation.

As such, the removal of the enclosed regions from the background print agent plane may be performed on those regions of the background print agent plane that have been eroded to fall underneath the image print agent plan The method (300) may include identifying (block 312) enclosed regions of background print agent in a background print agent plane, determining (block 314) a size of the enclosed regions, and determining (block 316) whether the enclosed regions are smaller than a threshold size. These operations may be performed as described above in connection with FIG. 2.

In some examples, the method (300) includes storing (block 318) indices for the enclosed regions in a database. That is, an array may be initialized to store the indexes of enclosed regions that are smaller than the threshold size. As described below, it may be that some of the enclosed regions are restored to the background print image plane, after having been removed, and the indices may allow the print controller (FIG. 1, 102) to effectively identify those to be restored.

As alluded to above, there may be some enclosed regions that should not be removed from the background print image plane. That is, it may be the case that certain fine detail features may be mis-identified as a "tear" that is to be removed from the background print image plane. As a particular example, small text may be identified as tears. However, these planes should not be removed as it may impact the quality of the printed product and may impede an end user's ability to read the text. Accordingly, the print controller (FIG. 1, 102) is to identify areas of the print image data wherein a removal of the enclosed regions is to be undone. Such areas may include enclosed regions within a threshold distance of one another. That is, the print controller (FIG. 1, 102) distinguishes "false" tears that should be retained from actual tears that should be removed as the false tears aggregate together in certain areas of the print image. More specifically, the print controller (FIG. 1, 102) is to identify areas, i.e., false tears, of the image where removed enclosed regions are to be restored to the background print image plane. In an example, this may be done by a morphological closing operation to identify the false tears.

Specifically, a bounding box may be drawn around each enclosed region. The bounding boxes may be filled and a morphological closing of a particular size, for example 10 pixels, may be applied.

A morphological closing of 10 pixels includes a dilation of 10 pixels followed by an erosion of 10 pixels. If there are many false tears close to each other, their respective bounding boxes may overlap. The dilation of 10 pixels may merge the bounding boxes and may fill holes between them. The subsequent erosion reduces the outside borders but does nothing to the filled holes thus leaving connected components. By comparison, actual tears to be removed are isolated such that performing a morphological closing may not generate any connected components.

In other words, each bounding box may be expanded by a threshold amount, for example by 10 pixels around the boundary of the enclosed region. In so doing, certain of the dilated enclosed regions may overlap with one another. Accordingly, the print controller (FIG. 1, 102) may identify those bounding boxes that overlap and thus form a connected component. If the connected component area is greater than a threshold amount, say for example, 1,500 or 3,000 pixels, the original and un-dilated enclosed regions are restored to the background print agent plane.

Again, it is noted that such operations may occur on digital, rather than a physical, version of the image. That is, the identification of enclosed regions, removal of such, and restoration of a subset of the enclosed regions may be performed on a digital file of print image data.

That is, initially all enclosed regions less than the threshold size are removed from the background print agent plane. However, if an enlarged version of an enclosed region overlaps with enough other enlarged enclosed regions to have an overall area greater than a threshold size, each of these enclosed regions that combined to form the connected component are restored to the background print image plane as having been identified as intentional fine detail rather than unintentional "tears."

FIGS. 4A-4F depict the removal of enclosed regions from a background print agent plane, according to an example of the principles described herein. In this example, the print image is to include large letters spelling "MEET YOUR MATTE" a variety of smaller text portions, a square shape, and an 8-pointed shape. In this example, the regions of the background print agent plane that are to receive background print agent are depicted in black whereas regions of the background print agent plane that do not receive background print agent are depicted in white.

As depicted in FIG. 4A and in the zoomed in portions, due to any number of reasons, such as printing device (FIG. 1, 100) constraints, previous operations to remove a halo around the text/images, or other circumstance, enclosed regions of background print agent may be formed in areas of the print job, for example, in the acute boundary regions of the characters. In the example depicted in FIG. 4A, a few examples of enclosed regions are identified by the circles (406-1, 406-2), however, others may exist as well. FIG. 4A depicts a zoomed in portion of the character "M" that depicts various enclosed regions. As demonstrated above, it may be desirable to retain the fine detail in the text in the bottom portion of the print image, which fine detail may be unintentionally removed during enclosed region removal.

Figure 4B:

As depicted in FIG. 4B, a digital binary threshold image may be generated wherein the enclosed regions smaller than a threshold size are indicated in one color, i.e., white, while enclosed regions greater than the threshold size, and other regions of the background print agent plane, are identified in black. As depicted in FIG. 4B, both the "tears" in the character "M" are identified as enclosed regions as are portions of the small text in another circle.

Figure 4C:
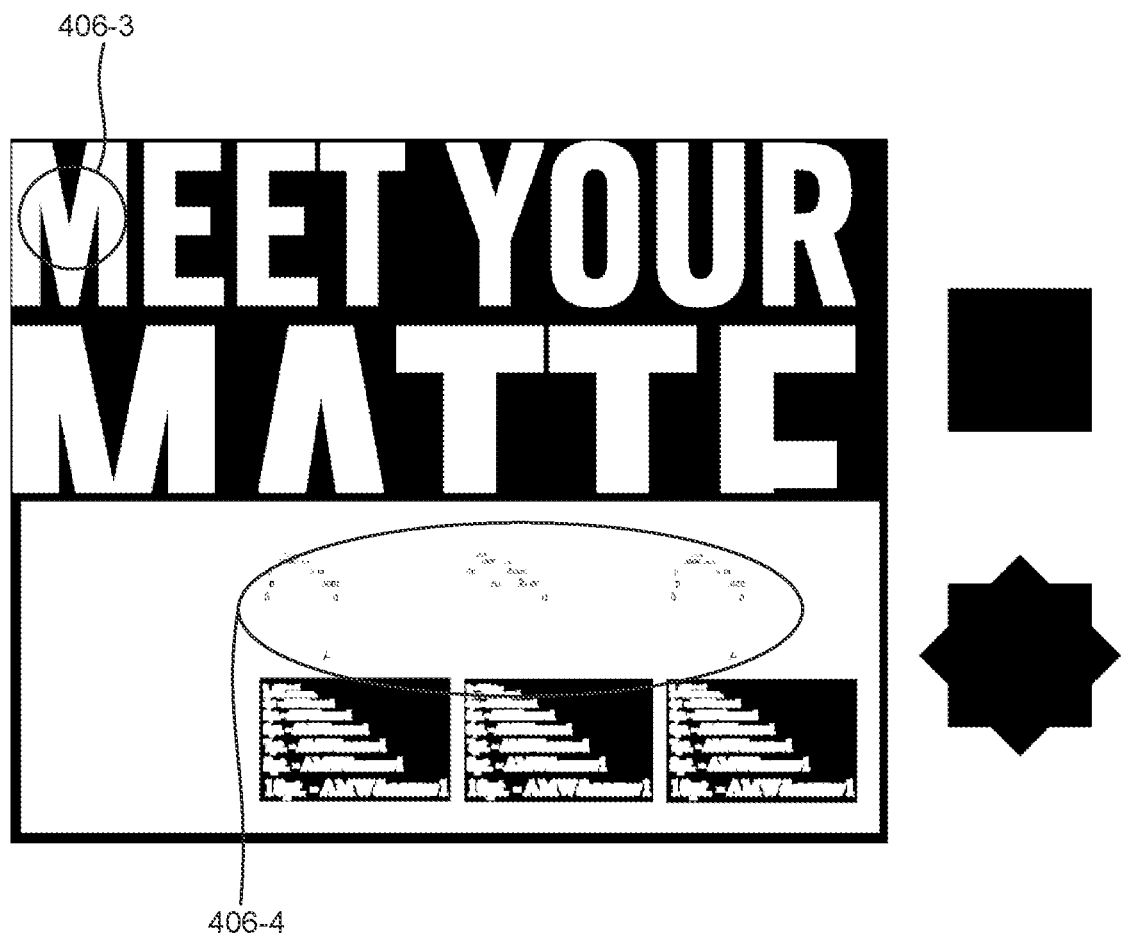

As depicted in FIG. 4C, due to the removal of the enclosed regions, a sharper version of the large lettering may be produced as depicted in an oval (406-3). However, this same operation may result in a loss of intended detail in other portions of the image as depicted in the second oval (406-4) of FIG. 4C.

Figure 4D:
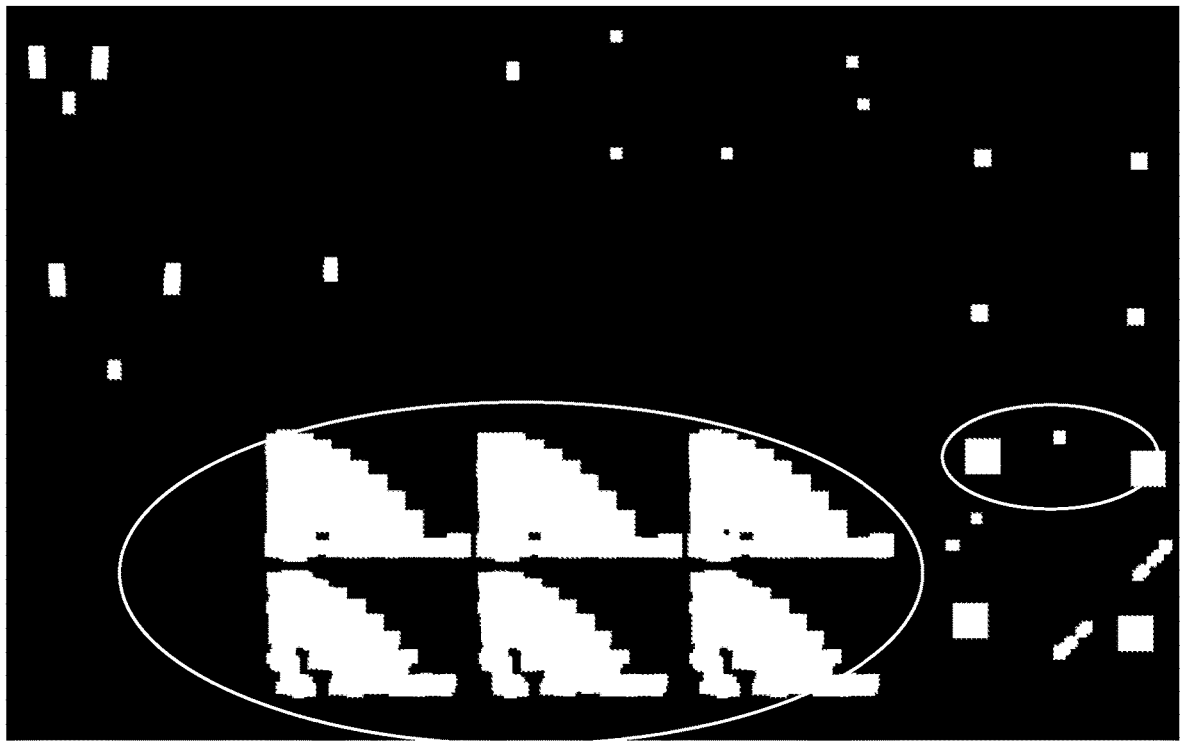

Accordingly, as depicted in FIG. 4D, bounding boxes around each of the enclosed regions may be enlarged and eroded such that certain enclosed regions may overlap with one another. In the event that the enlargement and overlapping result in connected components greater than a threshold size, as indicated in the enclosed circles in FIG. 4D, these regions may be identified as those for which the removal of the enclosed regions is reversed. In the example depicted in FIG. 4D, a few examples of connected components are identified by the circles, however, others may exist as well. Thus, the present method 1) removes unwanted artifacts of a background print image plane and 2) maintains high detail and intentional detail in other areas of the print image.

Figure 4E:
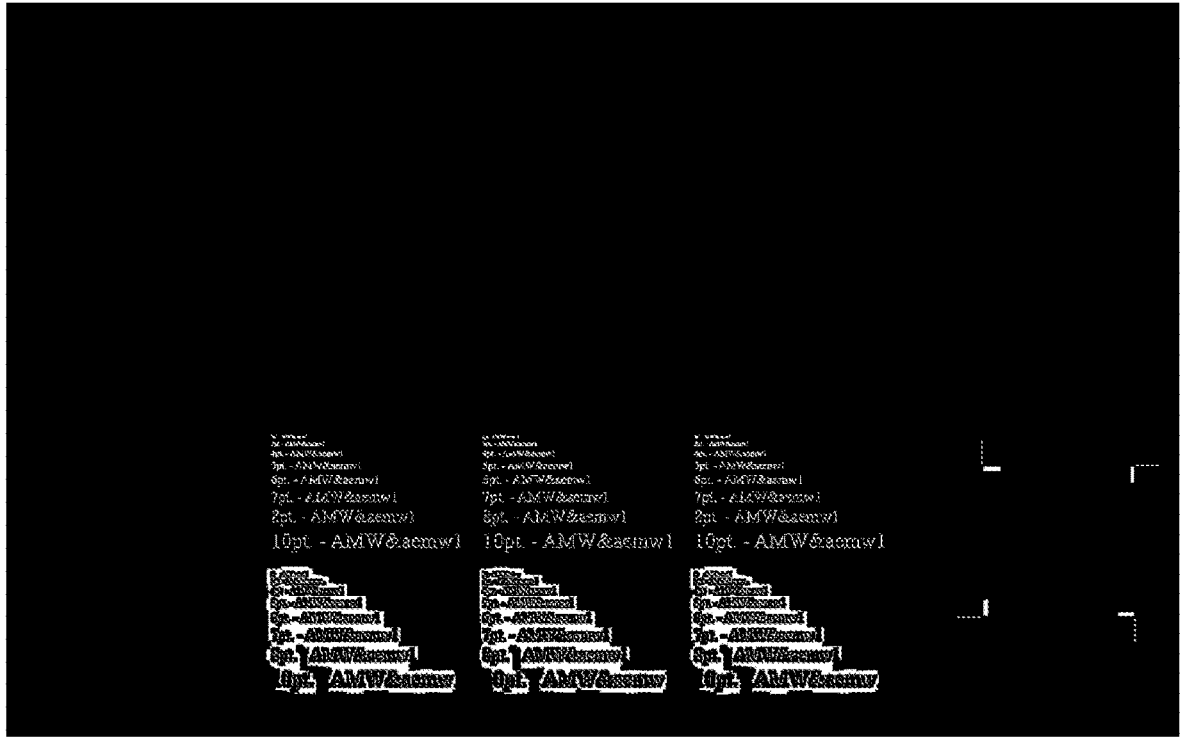

FIG. 4E depicts those enclosed regions, i.e., those within the connected components, that are returned to the background print agent plane. That is, these enclosed regions represent fine detail that is desired to be retained in the printed product as compared to enclosed regions that are unintentional and are to be removed, such as those in the character "M" that were removed in FIGS. 4A-4C.

Figure 4F:
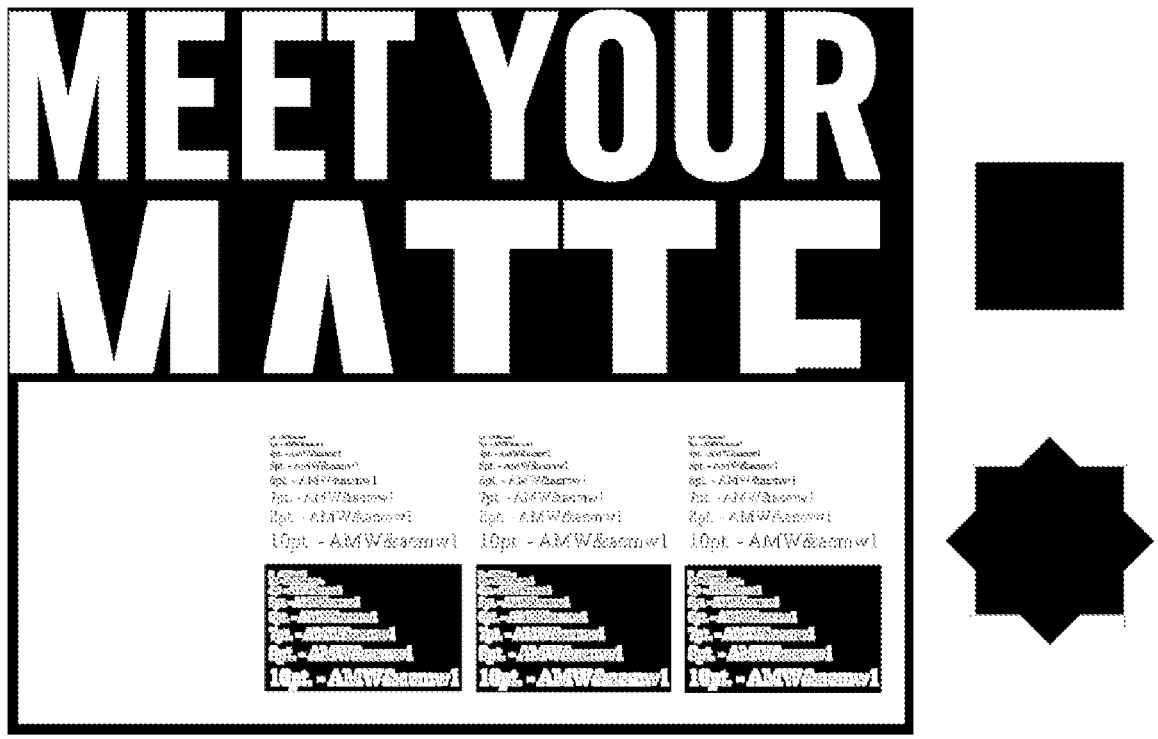

FIG. 4F depicts a final print image file where 1) unintentional enclosed regions of the background print agent plane have been removed and 2) intentional fine detail has been retained. This print image file may be passed to the print agent distribution system (FIG. 1, 104) for generation of a physical printed product.

Figure 5:
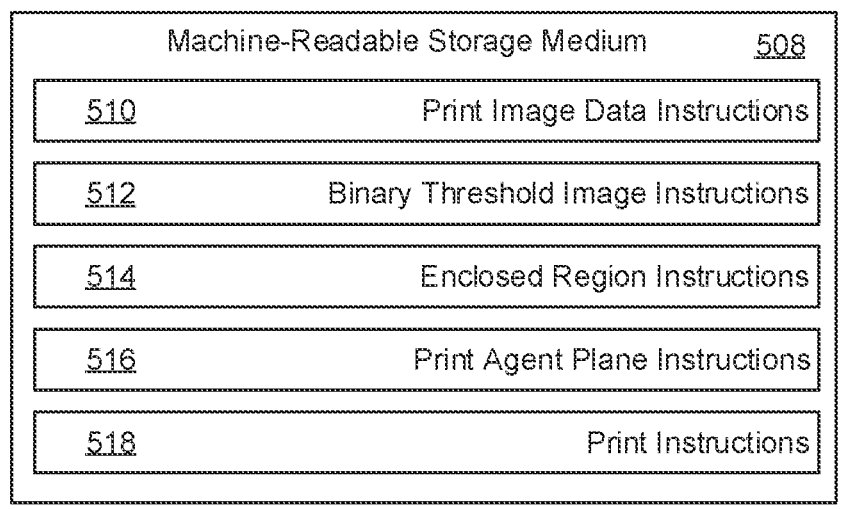
FIG. 5 depicts a non-transitory machine-readable storage medium for removing regions from a background print agent plane, according to an example of the principles described herein.

FIG. 5 depicts a non-transitory machine-readable storage medium (508) for removing regions from a background print agent plane, according to an example of the principles described herein. To achieve its desired functionality, a computing system includes various hardware components. Specifically, a computing system includes a processor and a machine-readable storage medium (508). The machine-readable storage medium (508) is communicatively coupled to the processor. The machine-readable storage medium (508) includes a number of instructions (510, 512, 514, 516, 518) for performing a designated function. The machine-readable storage medium (508) causes the processor to execute the designated function of the instructions (510, 512, 514, 516, 518). The machine-readable storage medium (508) can store data, programs, instructions, or any other machine-readable data that can be utilized to operate the printing device (FIG. 1, 100). Machine-readable storage medium (508) can store computer readable instructions that the processor of the controller can process, or execute. The machine-readable storage medium (508) can be an electronic, magnetic, optical, or other physical storage device that contains or stores executable instructions. Machine-readable storage medium (508) may be, for example, Random Access Memory (RAM), an Electrically Erasable Programmable Read-Only Memory (EEPROM), a storage device, an optical disc, etc. The machine-readable storage medium (508) may be a non-transitory machine-readable storage medium (508).

Referring to FIG. 5, print image data instructions (510), when executed by the processor, cause the processor to receive print image data representing an image to be printed. Binary threshold image instructions (512), when executed by the processor, may cause the processor to generate a digital binary threshold image wherein regions that are to receive a background print agent are in a first color and regions that are not to receive a background print agent are in a second color. Enclosed region instructions (514), when executed by the processor, may cause the processor to determine from the binary threshold image 1) enclosed regions of the background print agent in the background print agent plane and 2) a size of each enclosed region of background print agent. Print agent plane instructions (516), when executed by the processor, may cause the processor to, responsive to a size of an enclosed region being less than a threshold size, remove the enclosed region from the background print agent plane. Print instructions (518), when executed by the processor, may cause the processor to apply the background print agent and the image print agent to a substrate according to the print instructions.

Such systems and methods 1) produce high quality printed products without artifacts; 2) increase the print quality without end user intervention; and 3) may be implemented across different platforms. However, it is contemplated that the systems and methods disclosed herein may address other matters and deficiencies in a number of technical areas.

What is claimed is:

1. A printing device, comprising:
a print controller comprising a processor and memory, the print controller to generate print instructions by:
receiving print image data representing an image to be printed;
identifying, in the print image data, enclosed regions in a background print agent in a background print agent plane;
determine a size of the enclosed regions of background print agent; and
responsive to the size of an enclosed region being smaller than a threshold size, removing the enclosed region from the background print agent plane; and
a print agent distribution system to apply the background print agent and the image print agent to a substrate according to the print instructions.

2. The printing device of claim 1, wherein the print controller is to restore removed enclosed regions where a size of a connected component formed of dilated enclosed regions is greater than a threshold size.

3. The printing device of claim 1, wherein the print controller is to:
identify, a coincident edge region between the background print agent plane and an image print agent plane, wherein the coincident edge region is an edge in an area to be printed with both the background print agent and the image print agent; and
selectively modify at least one of the background print agent plane and the image print agent plane in a vicinity of the identified coincident edge region to determine a modified plane.

4. The printing device of claim 3, wherein selectively modifying at least one of the background print agent plane and the image print agent plane in a vicinity of the identified coincident edge region to determine a modified plane comprises:
performing a pixel erosion operation along the identified coincident edge region in the background print agent plane; and
determining whether there is a local region of background print agent that will be less than a threshold size following the erosion and, when at least one such region is identified, excluding the identified local region from the pixel erosion operation.

5. The printing device of claim 1, wherein the print controller is to identify a subset of locations as candidate locations for enclosed regions.

6. The printing device of claim 1, wherein the print controller is to identify areas of the print image from the print image data for which the removal of enclosed regions is to be undone.

7. A method, comprising:
receiving, at a printing device, print image data representing an image to be printed;
identifying, from the print image data, enclosed regions in a background print agent in a background print agent plane;
determine a size of enclosed regions of the background print agent;
responsive to the size of an enclosed region being smaller than a threshold size, removing the enclosed region from the background print agent plane; and
applying the background print agent and the image print agent to a substrate according to the print instructions.

8. The method of claim 7, further comprising:
identifying areas of the print image wherein a removal of the enclosed regions is to be undone; and
undoing the removal of enclosed regions within identified areas.

9. The method of claim 8, wherein identifying regions of the image where the enclosed regions are to be restored comprises:
expanding and eroding the enclosed regions by a threshold amount;
identifying those enclosed regions that overlap to form a connected component; and
responsive to a connected component area being greater than a threshold area, identifying the connected component as a region of the image to be restored to the background print agent plane.

10. The method of claim 7, further comprising altering the threshold size based on user input.

11. The method of claim 7, further comprising:
identifying a coincident edge region in the background print agent plane and an image print agent plane, wherein the coincident edge region is an edge in an area to be printed with both the background print agent and the image print agent;
performing a pixel erosion operation along the identified coincident edge region in the background print agent plane; and
determining whether there is a local region of background print agent that will be less than a threshold size following the erosion and, if at least one such region is identified, excluding the identified local region from the pixel erosion operation.

12. A non-transitory machine-readable storage medium encoded with instructions executable by a processor, the machine-readable storage medium comprising instructions to:

receive print image data representing an image to be printed;

generate a binary threshold image wherein regions that are to receive a background print agent is in a first color and regions that are not to receive a background print agent is in a second color;

determine from the binary threshold image:
    enclosed regions in a background print agent plane; and
    a size of each enclosed region of background print agent plane;

responsive to a size of an enclosed region being less than a threshold size removing the enclosed region from the background print agent plane; and apply the background print agent and the image print agent to a substrate according to the print instructions.

13. The non-transitory machine-readable storage medium of claim 12, further comprising instructions, executable by the processor, to store indices of the enclosed regions.

14. The non-transitory machine-readable storage medium of claim 13, further comprising instructions, executable by the processor to:
    expand and erode the enclosed regions by a threshold amount;
    identify those enclosed regions that overlap to form a connected component; and
    responsive to a connected component area being greater than a threshold area, identifying the connected component as a region of the image to be restored to the background print agent plane.

15. The non-transitory machine-readable storage medium of claim 13, wherein removal of enclosed regions of the background print agent plane is performed on areas of the background print agent plane that have been eroded to fall underneath the image print agent plane.

\* \* \* \* \*